June 17, 1930.     C. E. HESS     1,764,449
AGRICULTURAL IMPLEMENT

Filed Sept. 3, 1929

Inventor
Charles E. Hess

By Hardway Cathey
Attorneys

Patented June 17, 1930

1,764,449

UNITED STATES PATENT OFFICE

CHARLES E. HESS, OF DONNA, TEXAS

AGRICULTURAL IMPLEMENT

Application filed September 3, 1929. Serial No. 389,964.

This invention relates to new and useful improvements in an agricultural implement.

One object of the invention is to provide an implement of the character described specially designed for use in cutting rows of stalks such as cotton stalks.

Another object of the invention is to provide an implement of the character described formed with spaced beams, the forward ends of which are provided with guide shoes or runners, said beams being anchored together with an arched frame with a novel type of cutter blade disposed between and anchored to said beams.

A further feature of the invention resides in the provision of an agricultural implement of the character described having plate like stalk guards, one secured to each beam so as to dispose said guards on opposite sides of the row.

With the above and other objects in view this invention has particular relation to certain novel features of construction, arrangement of parts and use, an example of which is given in this specification and illustrated in the accompanying drawings, wherein.

Figure 1:
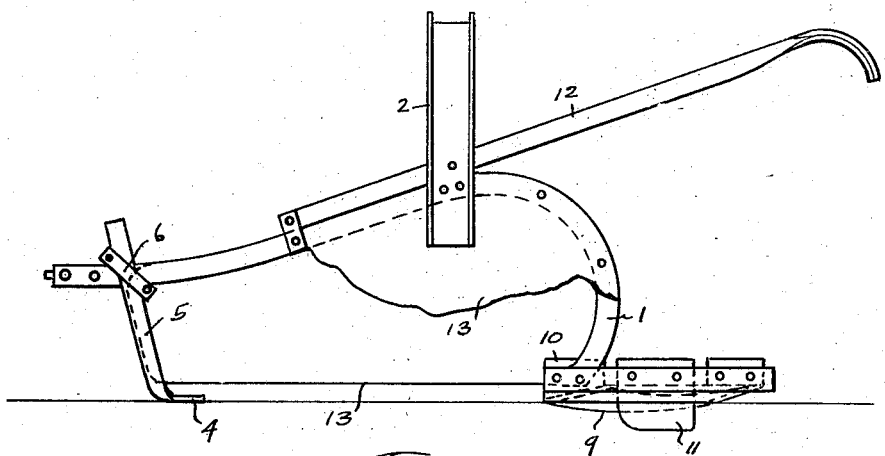
Figure 1 shows a side elevation of the implement.
Figure 2:
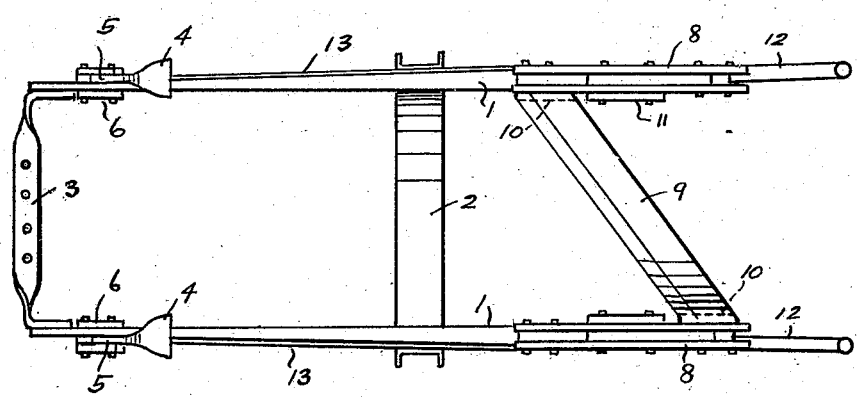
Figure 2 shows a bottom plan view thereof.

Referring now more particularly to the drawings wherein like numerals of reference designate similar parts in each of the figures the numerals 1 designate the beams which are spaced apart and are of arch like construction with their forward ends extended, and disposed substantially parallel with the ground surface. These beams are connected by an archlike frame 2 which is bolted thereto intermediate their ends and their forward ends are connected by the transverse draw bar 3 whose ends are bolted thereto. There are the guide shoes or runners 4, 4 which are rearwardly turned and which are attached to the lower ends of the shanks 5, 5. These shanks are clamped to the forward ends of the respective beams by means of the clamps 6, 6. The rear ends of the beams are downwardly turned, and bolted to the forward ends of the shoes 8, 8, each shoe being preferably formed of spaced rearwardly extending bars which are bolted together with the beam ends bolted between the forward ends thereof. There is a cutter blade 9 whose ends 10, 10 are upturned and bolted one to the rear end of one shoe and the other to the forward end of the other shoe. This last mentioned shoe has a plate 11 bolted thereto and disposed behind the blade 9. Said plate 11 penetrates into the ground surface and is effective to prevent side swinging of the implement. The cutter blade 9 is downwardly curved so as to penetrate the earth and shear off the roots of the stalks to be cut.

The implement is equipped with the handles 12, 12 which are bolted to the sides of the arched frame 2 and whose forward ends are attached to the respective beams.

The implement is propelled along the row in any preferred manner the runners 4 being disposed one on each side of the row and as the implement is propelled along the blade 9 will effectively cut the stalks in the row.

Side guards as 13, 13 are provided. These are preferably formed of sheet metal and are disposed in vertical position, one being bolted to each of the beams 1 as shown. These side guards confined the stalks to be cut between the beams and cause the stalk to fall in a compact row where they may be readily burned.

The drawings and description disclose what I now consider to be a preferred form of the invention, by way of illustration only, while the broad principle of the invention will be defined by the appended claims.

What I claim is:

1. A stalk cutter including side beams, a transverse frame to which said beams are attached, a draw bar connecting the front end of the beams, guide runners depending from the forward ends of the beams, a shoe attached to the rear end of each beam, a transverse diagonally disposed cutter blade between and attached to said shoes, and a guide plate secured to and depending from one of said shoes.

2. A stalk cutter including side beams spaced apart, a transverse frame to which said beams are attached, a shoe attached to the rear end of each beam, a transversely disposed cutter blade anchored to the implement between said beams and a side guard plate carried by each beam.

In testimony whereof I have signed my name to this specification.

CHARLES E. HESS.